United States Patent
Zhai et al.

(10) Patent No.: US 9,516,305 B2
(45) Date of Patent: Dec. 6, 2016

(54) ADAPTIVE SCALER SWITCHING

(71) Applicant: Apple Inc., Cupertino, CA (US)

(72) Inventors: Jiefu Zhai, San Jose, CA (US); Douglas Price, San Jose, CA (US); Albert Keinath, Sunnyvale, CA (US); Xiaosong Zhou, Campbell, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 584 days.

(21) Appl. No.: 13/744,049

(22) Filed: Jan. 17, 2013

(65) Prior Publication Data

US 2014/0072029 A1 Mar. 13, 2014

Related U.S. Application Data

(60) Provisional application No. 61/699,068, filed on Sep. 10, 2012.

(51) Int. Cl.
| | |
|---|---|
| *H04N 7/12* | (2006.01) |
| *H04N 19/10* | (2014.01) |
| *H04N 19/172* | (2014.01) |
| *H04N 19/127* | (2014.01) |
| *H04N 19/156* | (2014.01) |
| *H04N 19/59* | (2014.01) |
| *H04N 19/44* | (2014.01) |
| *H04N 19/42* | (2014.01) |

(52) U.S. Cl.
CPC ...... *H04N 19/00006* (2013.01); *H04N 19/127* (2014.11); *H04N 19/156* (2014.11); *H04N 19/172* (2014.11); *H04N 19/59* (2014.11); *H04N 19/42* (2014.11); *H04N 19/44* (2014.11)

(58) Field of Classification Search
CPC .. H04N 19/115; H04N 19/124; H04N 19/132; H04N 19/154; H04N 19/164; H04N 19/172
USPC ........ 375/240.01–240.29; 713/300; 345/204; 348/452
See application file for complete search history.

(56) References Cited

U.S. PATENT DOCUMENTS

| | | | |
|---|---|---|---|
| 6,091,777 A | 7/2000 | Guetz et al. | |
| 6,442,206 B1 * | 8/2002 | Hrusecky | H04N 19/59 348/446 |
| 6,490,320 B1 * | 12/2002 | Vetro | H04L 29/06 375/240.08 |
| 7,528,889 B2 | 5/2009 | Bhatia et al. | |
| 8,225,112 B2 * | 7/2012 | Koul et al. | 713/300 |
| 8,238,423 B2 | 8/2012 | Shibata et al. | |
| 8,250,618 B2 * | 8/2012 | Rosenzweig | H04N 21/234363 375/240.02 |

(Continued)

*Primary Examiner* — Gims Philippe
(74) *Attorney, Agent, or Firm* — Baker & Hostetler, LLP

(57) ABSTRACT

An adaptive scaler switching system may implement multiple scalers including both a software scaler and a hardware scaler, and a controller that may manage the switch between scalers by considering the real-time constraints of the system and the available system resources. Information about the availability of system resources may be received in real-time, for example the controller may receive information about the system thermal status, the timing requirements for processing the video data, the quality of the scaled data, and any other relevant system statistics that may affect the scaler switch decision. According to an embodiment, the system may maintain statistics in a table, and update the table information as necessary.

28 Claims, 6 Drawing Sheets

(56) References Cited

U.S. PATENT DOCUMENTS

| | | | |
|---|---|---|---|
| 8,429,699 B2 * | 4/2013 | Rodriguez | H04N 21/25808 345/501 |
| 2003/0007566 A1 * | 1/2003 | Peng et al. | 375/240.25 |
| 2004/0218099 A1 * | 11/2004 | Washington | H04N 5/77 348/571 |
| 2007/0152990 A1 * | 7/2007 | Callway | 345/204 |
| 2008/0043141 A1 * | 2/2008 | Namioka | 348/452 |
| 2010/0046612 A1 | 2/2010 | Sun et al. | |
| 2011/0235702 A1 | 9/2011 | O'Connell et al. | |

* cited by examiner

100

200

300

400

500

600

ADAPTIVE SCALER SWITCHING

CROSS-REFERENCE TO RELATED APPLICATION

This application claims the benefit of priority afforded by provisional application Ser. No. 61/699,068, filed Sep. 10, 2012, entitled "Adaptive Scalar Switching in Embedded Video System."

BACKGROUND

In video coding systems, a conventional encoder may code a source video sequence into a coded representation that has a smaller bit rate than does the source video and, thereby achieve data compression. Coded video may be stored and/or transmitted according to a coding policy, typically conforming to a standard such as MPEG4 or MP4. A decoder may then invert the coding processes performed by the encoder to retrieve the source video. The decoded data may then be displayed on a display device.

Video coding systems initially may separate a source video sequence into a series of frames, each frame representing a still image of the video. A frame may be further divided into blocks of pixels. Each frame of the video sequence may then be coded on a block-by-block basis according to any of a variety of different coding techniques. For example, using predictive coding techniques, some frames in a video stream may be coded independently (intra-coded I-frames) and some other frames may be coded using other frames as reference frames (inter-coded frames, e.g., P-frames or B-frames). P-frames may be coded with reference to a single previously coded frame and B-frames may be coded with reference to a pair of previously coded frames.

To prepare the video data for compression or display, each frame may be scaled. For example, in limited bandwidth situations, an encoder may downscale high-resolution source video to a lower resolution in order to achieve greater compression. Similarly, a decoder may upscale or downscale each frame in a recovered sequence in order to prepare the recovered video for display on displays of different sizes.

Video scaling is conventionally implemented with a dedicated hardware application specific integrated circuit (ASIC) or image signal processor (ISP) that may provide consistent latency but may be limited to a fixed algorithm, a restricted set of variable coefficients, and restrictions on the input and output ranges for scaling. However conventional software scalers are more flexible but commonly require extensive processing time and other system resources. Accordingly, there is a need in the art for a more flexible scaler that has low latency.

DETAILED DESCRIPTION

An adaptive scaler switching system may implement multiple scalers including both a software scaler and a hardware scaler, and a controller that may manage the switch between scalers by considering the real-time constraints of the system and the available system resources. Information about the quality and performance of the system scalers may be gathered during system downtime or initialization. Such information may be measured and saved as reference for decision-making by the controller. Scaler performance may be measured in terms of system resources, including for example execution time and power consumption. Video quality may also be considered and may be determined subjectively, for example by receiving feedback from viewers about which displayed image, and accordingly which method of scaling used to achieve that image, is better for a given input-output combination.

Additionally, information about the availability of system resources may be received in real-time, for example the controller may receive information about the system thermal status, the timing requirements for processing the video data, and any other relevant system statistics that may affect the scaler switch decision, then when the system thermal level is high, the scaler controller may choose a scaler that consumes less power without considering other factors. The scaler controller may also choose a scaler based on timing considerations, such that under a tight schedule, the scaler controller may choose the scaler that runs faster. The scaler controller may alternately choose the scaler that produces a better quality image.

Figure 1:
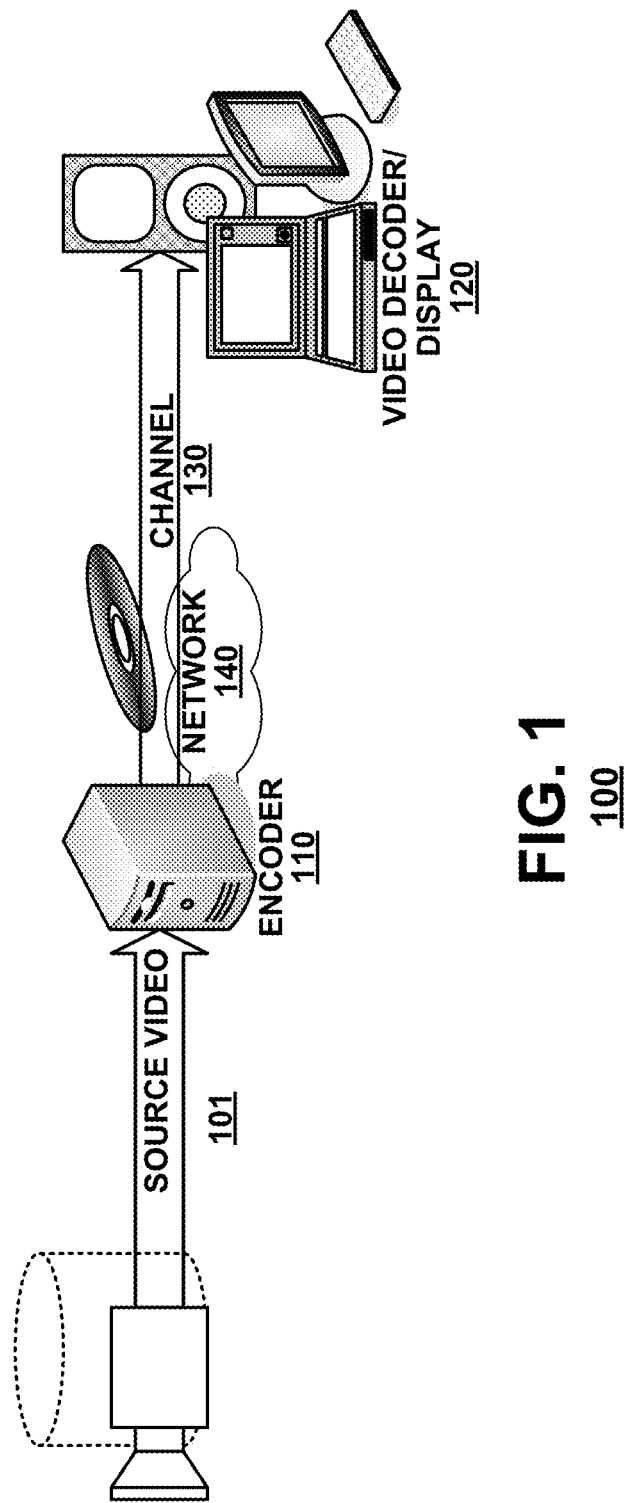
FIG. 1 is a simplified block diagram of an exemplary video coder/decoder system suitable for use with the present invention.

FIG. 1 is a simplified block diagram of a video coder/decoder system 100 suitable for use with the present invention. A video coder/decoder system 100 may include terminals that communicate via a network 140. The terminals each may capture video data locally and code the video data for transmission to another terminal via the network 140. Each terminal may have multiple types of scalers for switching based on system characteristics. Each terminal may receive the coded video data of the other terminal from the network 140, decode the coded data and display the recovered video data. Video terminals may include personal computers (both desktop and laptop computers), tablet computers, handheld computing devices, computer servers, media players and/or dedicated video conferencing equipment.

A video coder/decoder system 100 may also include an encoder system 110 that may accept a source video sequence 101 and may code the source video sequence 101 as coded video, which typically has a much lower bit rate than the source video. In coding, the system may have and decide between multiple scalers for portions of the input frames, or parts of a video sequence frame. The system may have a table that stores data associated with, for example, timing or thermal requirements of the system. For example, if the system is heating up, it may adaptively use a scaler which requires less heat for certain parts of the video.

A video coder/decoder system 100 may also include a channel 130 that delivers the coded video data output from the coding engine to a decoder. The encoder system 110 may output the coded video data to the channel 130, which may be a storage device, such as an optical, magnetic or electrical storage device, or a communication channel formed by computer network or a communication network for example either a wired or wireless network.

A video coder/decoder system 100 may also include a decoder system 120 that may retrieve the coded video data from the channel 130, invert the coding operations performed by the encoder system and output decoded video data to an associated display device. The decoder system 120 may similarly use multiple scalers, for example, one hardware and one software scaler, adaptively based on the fixed or changing system requirements.

As shown the video coder/decoder system 100 supports video coding and decoding in one direction only. For bidirectional communication, an encoder and decoder may each be implemented at each terminal such that each terminal may capture video data at a local location and code the video data for transmission to the other terminal via the network 140. Each terminal may receive the coded video data of the other terminal from the network, decode the coded data and display video data recovered therefrom. Each side of the bidirectional system may use the multiple adaptive scalers. For example, either side may send or receive the video data and store system statistics such as power, or speed or bandwidth.

Figure 2:
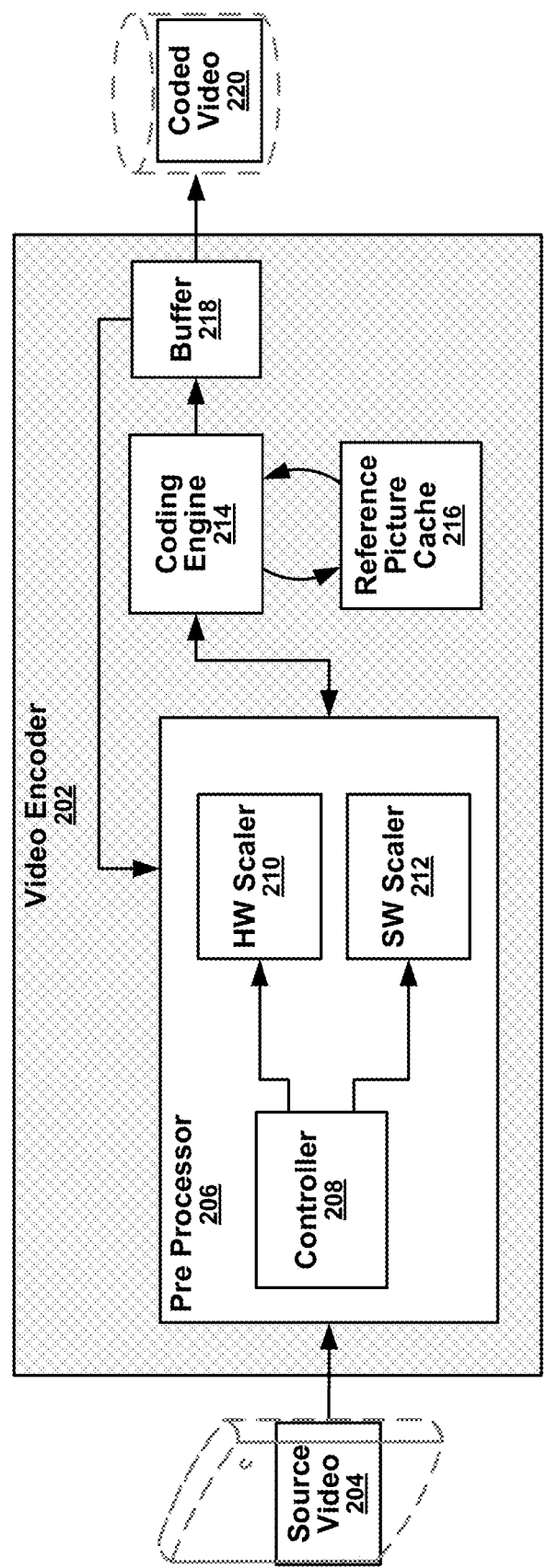
FIG. 2 is a simplified block diagram of an exemplary system for video encoding according to an embodiment of the present invention.

FIG. 2 is a simplified block diagram of a system 200 for video encoding according to an embodiment of the present invention. The encoder 202 may include a pre-processor 206 that receives the input video data from the video source 204, such as a camera or storage device and prepares the frames for encoding, and an encoding engine 214 that codes the video in a specified format such as MPEG or Quicktime. The pre-processor 206 may include a controller 208 which may adaptively select a scaler such as hardware scaler 210 or software scaler 212 based on system characteristics. The coding engine 214 may access reference picture cache 216 for quick access to reference frames from the video, and output coded video to buffer 218.

As shown in FIG. 2, the pre-processor 206 may perform video processing operations on video frames including filtering operations such as de-noising filtering, bilateral filtering or other kinds of processing operations that improve efficiency of coding operations performed by the encoder. Typically, the pre-processor 206 may analyze and condition the source video for more efficient compression.

The pre-processor 206 may include multiple scalers, such as a hardware scaler 210 and a software scaler 212, and a controller 208 to manage the switching decisions for the scalers 210, 212. Using the scalers 210, 212, the pre-processor 206 may down-scale the source video data to increase compression of the original data and to make compression and coding more efficient. In an embodiment, the scalers may upscale the video for display on a larger display.

The controller 208 may receive feedback from the other components of the video encoder 202 in order to determine system statistics that may facilitate the switch decision. For example, the controller 208 may monitor the timing requirements for frames being processed by the coding engine 214. For example, if system requirements demand frames be output faster or slower due to scheduling the controller 208 may select the appropriate scaler 210, 212 which will scale faster or slower. Similarly, if there are no timing requirements, the controller 208 may choose the scaler 210, 212 which outputs a higher quality image. Additionally, the thermal and power limitations of the encoder may be known to the controller 208 and the current thermal or power status of the encoder may be received by the controller 208 and used to make the scaler switch decision. The thermal and power limitations may be calculated in real time in one embodiment so that the system may adapt to a system which is overheating. Also, in another embodiment, the power status of the system may be determined upon startup or in real time to determine if any limitations should be imposed. For example, if the system is powered by battery and the battery power is low, the lower power consuming scaler may be chosen adaptively. Other relevant system statistics may be gathered by the controller 208.

The controller 208 may provide any necessary coefficients or other variables to the scalers as necessary. For example, the controller 208 may set the desired output resolution or downscale ratio for a hardware scaler 210 according to the limitations of the scaler. Additionally, the controller 208 may set the output resolution and other variables, or adjust the scaling algorithm, of a software scaler 212 as available.

The encoder 202 may also include an coding engine 214 that codes processed frames according to a variety of coding modes to achieve bandwidth compression. The encoder 202 may further include memory, such as reference picture cache 216, to store the reference frame cache for the encoder 202 including reconstructed frame data that may represent sources of prediction for later-received frames.

The encoder 202 may additionally include a coded video data buffer 218 to store the coded data 220 until it is combined into a common bit stream to be delivered by a transmission channel to a decoder or terminal, or otherwise output on a channel and stored for future use. The data buffer 218 may provide feedback to the controller 208 that identifies the buffer capacity, the output conditions for data being transmitted on a network, and/or the feedback from the receiving terminal including packet acknowledgments. Then the network bandwidth or packet loss rate may be system characteristics that inform the scaler decision.

Figure 3:
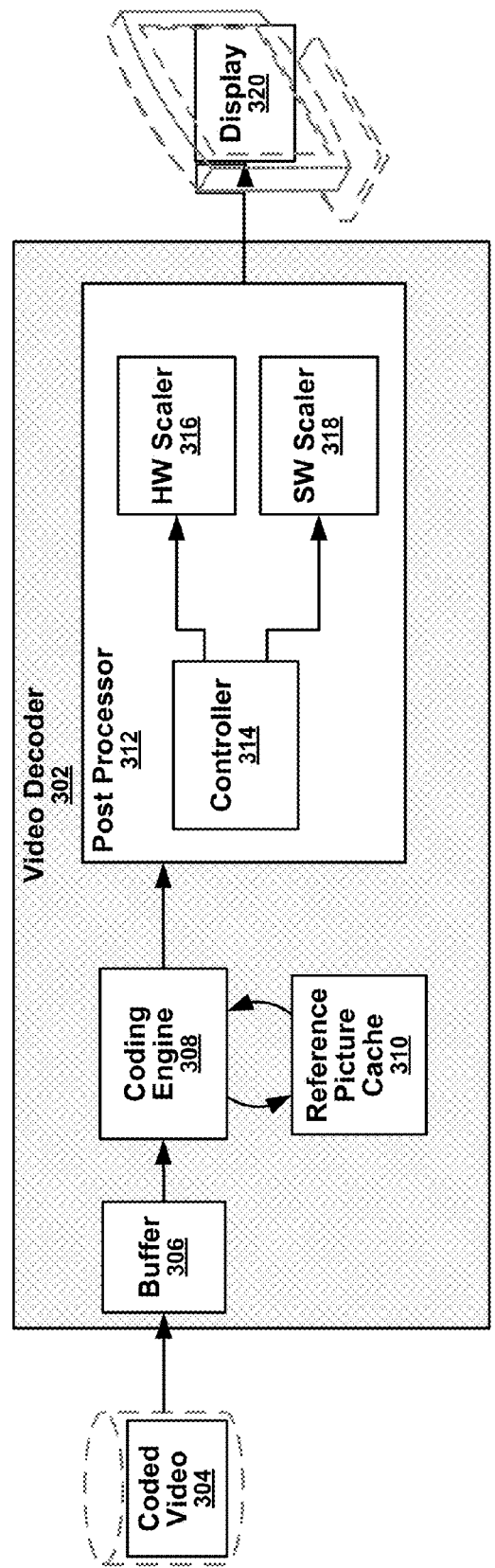
FIG. 3 is a simplified block diagram of an exemplary system for video decoding according to an embodiment of the present invention.

FIG. 3 is a simplified block diagram of an exemplary system 300 for video decoding according to an embodiment of the present invention. As shown in FIG. 3, a video decoder 302 may include a buffer 306 to receive and store coded data 304 before processing by the decoding engine 308, and a decoding engine 308 to receive coded video data 304 and invert coding and compression processes performed by an encoder. The decoding engine 308 may parse the received coded video data 304 to recover the original source video data for example by decompressing the frames of a received video sequence by inverting coding operations performed by the encoder. The decoder may also include a memory 310 to store a reference frame cache for the video decoder 302, and a display pipeline that may represent further processing stages to prepare the decoded video sequence for display on a display device 320.

The decoder may also include a post-processor 312 that prepares the video data for display. This may include filtering, de-interlacing, de-blocking, sharpening, up-scaling, noise masking, or other post-processing operations. The post-processor 312 may additionally include multiple scalers, such as a hardware scaler 316 and a software scaler 318, and a controller 314 to manage the scalers. The image data may be scaled to properly fit the display area of the display device 320 or otherwise provide the proper resolution for the output. The controller 314 may make a determination to switch from one scaler to another when system requirements dictate upon startup. The controller 314 may additionally receive feedback from the other components of the decoder in order to determine system statistics, for example in real time, that may facilitate the scaler switch decision (not shown) including for example if a video is being displayed in real time such as a live chat, or if a video is downloaded or stored locally and then being played, or if a video is being streamed from the internet. The controller 314 may also receive feedback that indicates output size or resolution display parameters, thermal conditions of the system, or power constraints. For example, the system may be overheating and require lower processing use, or the system may be plugged in or powered by a battery and need either no power limitations or more strict power limitations respectively.

Figure 4:
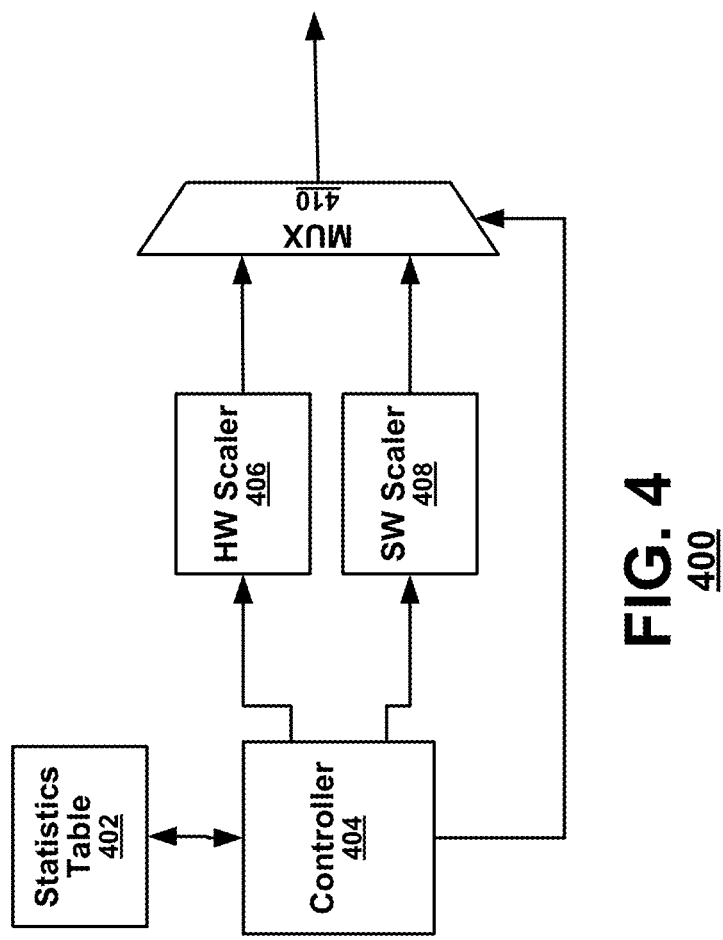
FIG. 4 illustrates an exemplary implementation of a multiple scaler unit according to an embodiment of the present invention.

FIG. 4 illustrates an exemplary implementation of a multiple scaler unit 400 according to an embodiment of the present invention. The unit 400 may include a controller 404 to select a scaler to perform a scaling operation and multiple scalers 406, 408 to scale the input video data. The controller 404 may include or otherwise have access to logic designed to facilitate the scaler decision mode by the controller 404. The controller 404 may assign scalers for a sequence of frames, for each frame or for a portion of a frame according to the system operating characteristics and the associated logic. The decision logic may be designed to maintain certain system conditions, such as to ensure that the system does not exceed a thermal or power budget, to maintain a predetermined coding rate, or to maintain a certain quality level. The decision logic may be designed to balance or otherwise prioritize the various characteristics and limitations. Then a scaler may be chosen and parameters set to accommodate the conditions or limitations as identified by the decision logic.

The multiple scaler unit 400 may include a hardware scaler 406. The hardware scaler 406 may be implemented as an ASIC or ISP and may have certain limitations. For example, the hardware scaler 406 may be restricted as to the types of inputs that may be set by the controller 404, including the upscale or downscale ratio. For example, some hardware scalers are limited to a 1-4× integer-based ratio such that an 800×800 image may be downscaled to either a 400×400 or 200×200 resolution. Such limitations may vary by scaler and may be made known to the controller 404 and/or look-up table 402 prior to or during system initialization.

The unit 400 may include a software scaler 408. The software scaler 408 may have certain additional flexibilities that may result in a higher quality output than the restricted hardware scalers 406. For example, the scaling algorithm may be adjusted, different variables may be set, or the variables may be set to a wider range of values. For instance, the complexity of the software scaler 408 can be configured to adjust the timing requirements of the software scaler 408 such that a very simple scaler runs faster than alternate scaler implementations or the hardware scaler 406.

According to an exemplary embodiment, the multiple scaler unit 400 may also include a statistics look-up table 402 for storing system statistics and other relevant information that may inform the scaler decision including known cost estimates for the various scalers. For example, during system initialization, or in the course of monitoring the system in operation, the cost estimates for each scaler 406, 408 may be calculated and stored. The cost estimates may include the power, thermal, quality and/or time costs and limitations of each scaler. The statistics look-up table 402 may additionally store the budget information for the system as available. For example, the total available power, the thermal limits, or the outer timing limits for the system may be stored with the statistics look-up table. The controller 404 may retrieve the system budget information and the scaler cost information from the statistics look-up table 402 and choose a scaler to scale the video data that meets the system requirements. The statistics look-up table 402 may be updated dynamically as the information about system cost estimates and budgets become available. The information may be received from the controller 404 or from other components monitoring the system either in real time or non real time.

Any of the information that may be stored in the statistics look-up table 402 may alternatively be sent directly to the controller 404. For example, the system thermal status and budget may be sent to the controller 404 for each frame. Similarly, the cost of each scaler may be looked up for each frame, periodically as necessary, or may be sent to the controller 404 when the cost is updated. Then the scaler decision may be altered periodically or upon detection of a change in the system operating conditions or the controller 404 may choose a scaler for each frame or for a sequence of frames.

The multiple scaler unit 400 may include a multiplexer 410 to store and combine the outputs of the scalers as necessary. A controller 404 may identify portions of a frame that require higher quality than other portions of the video frame. The controller 404 may select the software scaler 408 to scale only the higher quality portions of the video frame. Then the multiplexer 410 may combine the scaler output by replacing portions of the frame processed by the hardware scaler 406 with the higher-quality portions of the software scaled frame. For example, the background of an image may be scaled with lower quality whereas the foreground, or specific identified objects, a face for example, may be scaled with a higher quality.

The multiple scalers may be used in scalable coding systems. For example, the lower-quality hardware scaler 406 may be used to code a base layer of video data. Then the enhancement layers may be coded using a combination of both the hardware scaler 406 and the software scaler 408.

Figure 5:
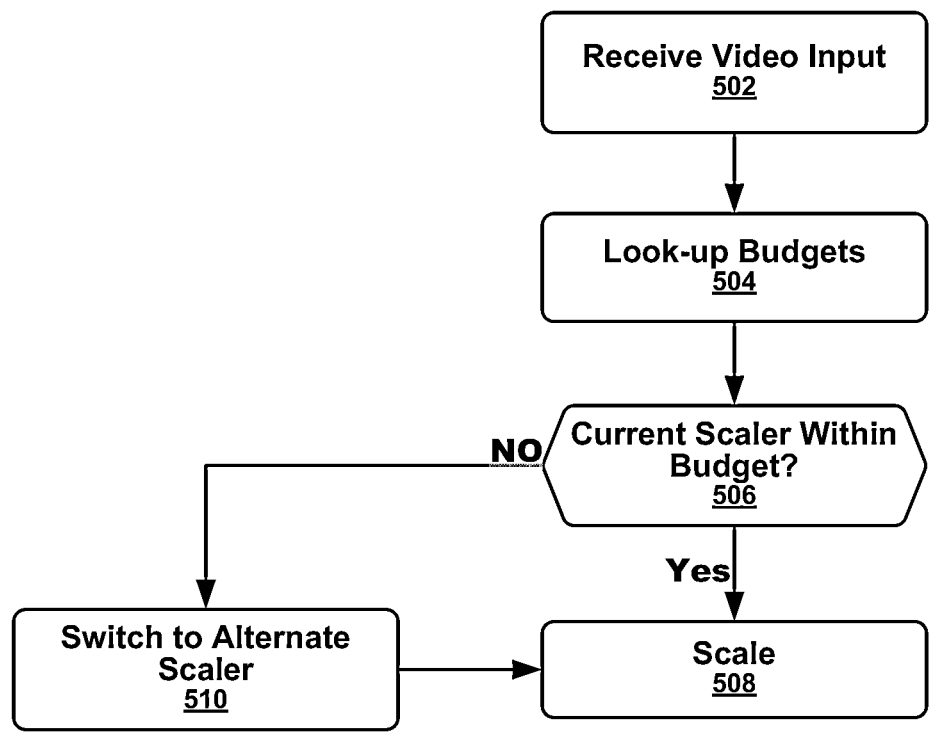
FIG. 5 is a simplified flow diagram illustrating an exemplary method for selecting between multiple available scalars to scale input video data

FIG. 5 is a simplified flow diagram illustrating an exemplary method 500 for selecting between multiple available scalers according to an embodiment of the present invention. As shown in FIG. 5, video data to be upscaled or downscaled may be initially received at a scaler unit (block 502). Then a controller or other processing unit may be implemented to identify a scaler for a portion of the video data, such portion may include a sequence of video frames, a single frame, or a part of a frame.

The controller may identify system characteristics (block 504) including characteristics' budgets and individual scaler costs for each characteristic including the current status of the system. Status may include the thermal conditions of the system such as if the system is overheating or not, the power requirements, or the timing requirements of the system. The characteristic information may be identified using a system statistics look-up table, or otherwise provided to the controller by the components of the system.

The controller may then identify a scaler that meets the characteristic requirements (block 506). For example, the controller may identify a characteristic budget to be applied for a frame. Then the controller may determine whether the current scaler meets the budget limits for that characteristic.

According to an embodiment, if more than one available scaler meets the budget requirements, the controller may review each available scaler and select the one that meets the characteristic budgets and that has the highest output image quality. In another embodiment, a system may prioritize speed over quality. In yet another embodiment, a system may prioritize power.

If the current scaler does not meet the budget limits of the defined characteristics, an alternate scaler that does meet the limits may be identified (block 510). In another embodiment, a third or fourth scaler may be chosen as well. The video data may then be scaled using the current or newly identified scaler (block 508).

Figure 6:
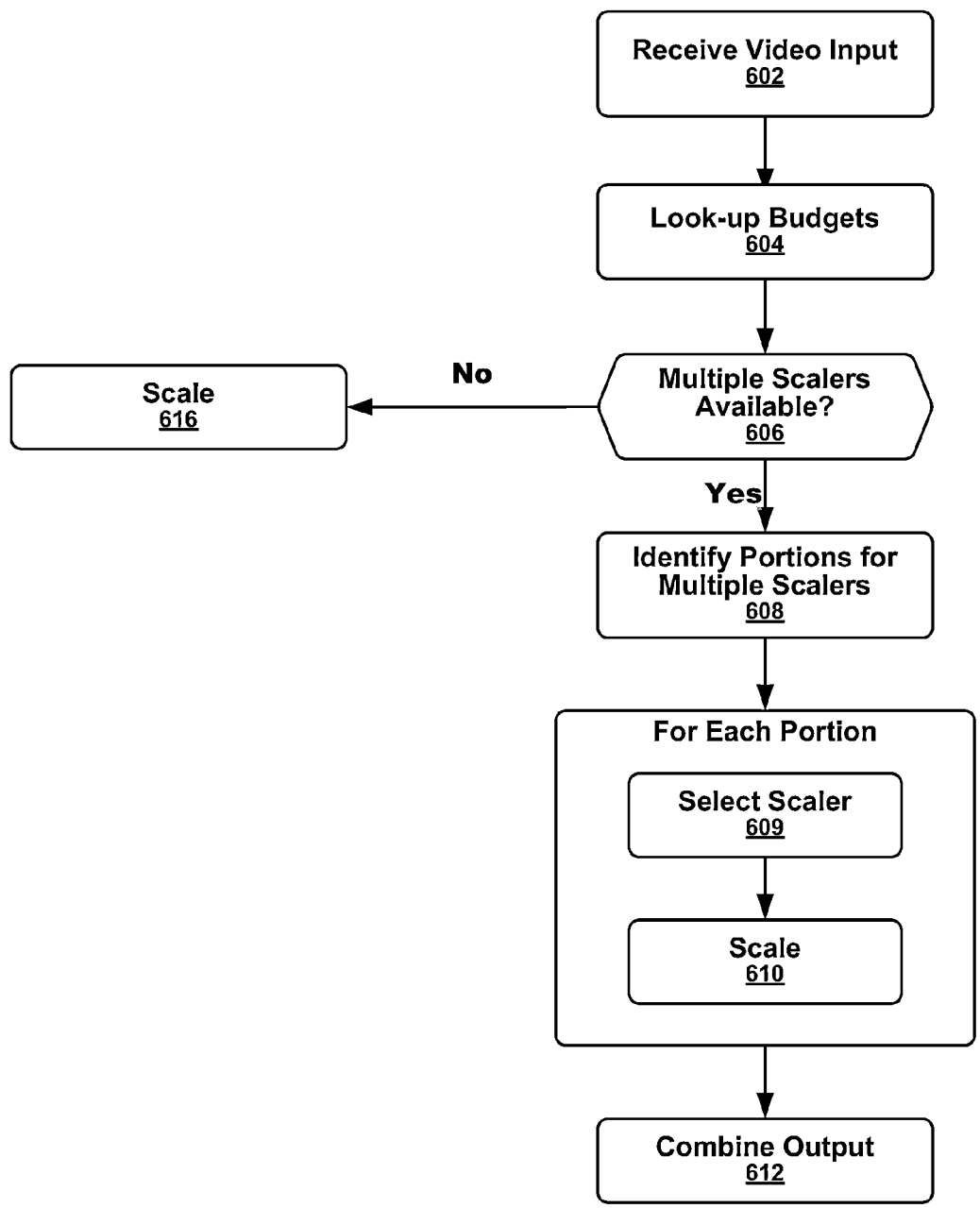
FIG. 6 is a simplified flow diagram illustrating an exemplary method for using multiple scalars to scale input video data.

FIG. 6 is a simplified flow diagram illustrating an exemplary method 600 for using multiple scalers according to an embodiment of the present invention.

Video data to be upscaled or downscaled may be received at a scaler unit (block 602). As shown in FIG. 6, a different scaler may be identified for different portions of the video data. For example, different scalers may be used for each frame, a slice, a block of pixels, or a group of blocks which may define an image segment such as a face.

The controller may identify system characteristics which may include characteristic budgets (block 604) and/or individual scaler costs for some or all of the characteristics. The characteristics may include the current thermal status of the system, the power conditions, such as battery or AC, and timing considerations for example.

The controller may determine whether multiple scalers are available for scaling the video data (block 606). The video data may then be scaled (block 616) using the available scaler if only one is available.

If multiple scalers are available, the controller may identify a portion of the video data that may be scaled using an alternate scaler (block 608). For example, a particular portion of a frame may benefit from higher quality scaling than the remaining portion of the frame. A software scaler which is configurable, for example, may be useful in adjusting settings to increase quality for a face, and decrease for non-moving objects for example. A hardware scalar may be appropriate at one time if the thermal conditions are high, and a software scaler when the system is cool, and vice versa.

The controller may then identify a scaler that meets the characteristic requirements (block 609) as described above with respect to FIG. 5. For example, a hardware or software scaler may either provide higher quality images, better power conditions or better thermal conditions. The identified portion of the video data may then be scaled using the second scaler (block 610). If multiple scalers were used, the output of each scaler may then be merged (block 612) such that any overlapping video data that was processed by both scalers may be combined and the higher quality data replaces the lower quality scaled portion of the same data.

Although the embodiments described herein are primarily portrayed with both a single hardware scaler and a single software scaler, alternate implementations are also considered. For example, two or more hardware or software scalers, or any combination of hardware and/or software scalers, may be implemented.

Some embodiments may be implemented, for example, using a non-transitory computer-readable storage medium or article which may store an instruction or a set of instructions that, if executed by a processor, may cause the processor to perform a method in accordance with the disclosed embodiments. The exemplary methods and computer program instructions may be embodied on a non-transitory machine readable storage medium. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. The machine readable storage media may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

Several embodiments of the invention are specifically illustrated and/or described herein. However, it will be appreciated that modifications and variations of the invention are covered by the above teachings without departing from the spirit and intended scope of the invention.

We claim:

1. A method for scaling video data, comprising:
receiving video data on a system, the video data including a video frame;
repeatedly:
identifying an operating state of the system;
selecting a first scaler from a plurality of scalers based on the system's operating state;
scaling a first portion of a video frame using the first selected scaler;
selecting a second scaler from a plurality of scalers based on the system's operating state;
scaling a second portion of the video frame using the second selected scaler; and
merging the scaled outputs of the first and second scalers into a single output video frame,
wherein relative amounts of the frames scaled by the first and second scalers change in response to changes of operating state of the system.

2. The method of claim 1, further comprising:
selecting a third scaler from the plurality of scalers based on a change in the system's operating state.

3. The method of claim 1, further comprising:
detecting a change in the video data; and
selecting a third scaler from the plurality of scalers based on changes in the video data.

4. The method of claim 1, wherein the identifying includes comparing the system's operating state to system resource budgets.

5. The method of claim 4, wherein at least one of the budgets include total power available in the system.

6. The method of claim 4, wherein at least one of the budgets include a thermal limit of the system.

7. The method of claim 4, wherein at least one of the budgets include a timing limit of the system.

8. The method of claim 1, wherein the operating state includes the system's thermal status.

9. The method of claim 8, wherein the selecting includes selecting the scaler with lower power consumption when the system's thermal status is high.

10. The method of claim 1, wherein the operating state includes timing requirements for the system.

11. The method of claim 10, wherein the selecting includes selecting a faster scaler when less processing time is available.

12. The method of claim 1, wherein the plurality of scalers includes at least one hardware and one software scaler, wherein the hardware and software scalers differ in performance with respect to each other, and wherein a lesser performing one of the hardware and software scalers is selected when both the hardware scaler and the software scaler satisfy the operating state.

13. The method of claim 12, wherein the software scaler is set up by the identified operating state.

14. The method of claim 1, further comprising displaying the scaled video data on a display device.

15. The method of claim 1, further comprising:
encoding the scaled video data using a predictive coding technique, wherein the scaling is performed separately from the encoding; and
transmitting the encoded video data on a channel.

16. The method of claim 1, further comprising:
decoding the scaled video data using a predictive coding technique, wherein the scaling is performed separately from the decoding; and
displaying the decoded video data on a display.

17. A method for scaling video data, comprising:
receiving a frame of video data on a system;
identifying an operating state of the system;
selecting a first scaler, based on the operating state, to scale a first portion of the frame;
scaling resolution of the first portion of the frame using the first scaler;
selecting a second scaler, based on the operating state, to scale a remainder of the frame;
scaling resolution of the remainder of the frame using the second scaler; and
merging the scaled portions of the frame.

18. The method of claim 17, further comprising repeating selection of the first and second scalers for a plurality of subsequently-received frames, wherein the relative portions of the frames that are scaled by each scaler is changed adaptively in response to changing operating state of the system.

19. The method of claim 17, further comprising displaying the merged frame on a display device.

20. The method of claim 17, further comprising:
encoding the frame using a predictive coding technique, wherein the scalings using the first scaler and the second scaler are performed separately from the encoding; and
transmitting the encoded video data on a channel.

21. A non-transitory computer readable storage device, storing program instructions that when executed cause an executing device to perform a method for video coding, the method comprising:
receiving video frames by a system that includes the executing device;
repeatedly:
identifying operating state of the system;
selecting a scaler from a plurality of scalers based on the system's operating state;
scaling a first portion of the video frames using the selected scaler; and
selecting a second scaler from a plurality of scalers based on the system's operating state;
scaling a second portion of the video frames using the selected scaler; and
merging the scaled outputs of the first and second scalers into a single output video sequence based on the system's operating state,
wherein relative amounts of the frames scaled by the first and second scalers change in response to changes of the system's operating state.

22. A system for scaling video data, comprising:
a first hardware-based scaler implemented in an integrated circuit;
a second software-based scaler implemented in programming that is executed by a controller; and
a control system that, responsive to changes in operational state of the system, adjusts relative portions of received frames to be processed by the hardware-based scaler and the software-based scaler.

23. The system of claim 22, wherein the hardware-based and software-based scalers differ in performance with respect to thermal performance, and wherein the control system selects whichever of the hardware-based and software-based scalers has lower thermal costs when both the hardware-based scaler and the software-based scaler satisfy thermal requirements of the system at a present operational state.

24. The system of claim 23, wherein the software-based scaler handles a greater range of inputs or outputs than the hardware-based scaler.

25. The system of claim 23, wherein the operating state is a cost requirement, and wherein the hardware-based scaler is less costly than the software-based scaler.

26. The system of claim 23, wherein the operating state is a power limit and the hardware-based scaler consumes less power than the software-based scaler.

27. The system of claim 22, wherein the system is a decoder that decodes video data to produce an input to the scalers.

28. The system of claim 23, wherein the system is an encoder that encodes video data using data output by the selected scalers.

* * * * *